Nov. 10, 1964  M. R. FARMER  3,156,081
COTTON PICKER SPINDLE SLAT POSITIONER HINGE MEANS
Filed Sept. 12, 1962  3 Sheets-Sheet 1
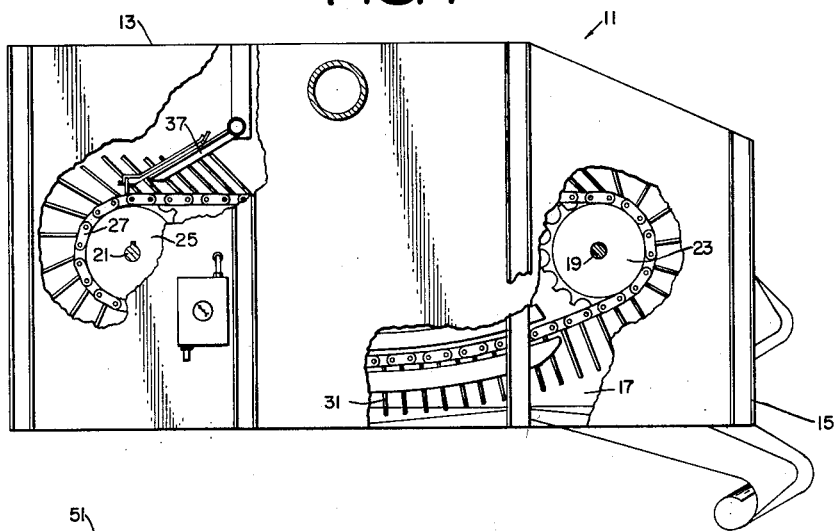
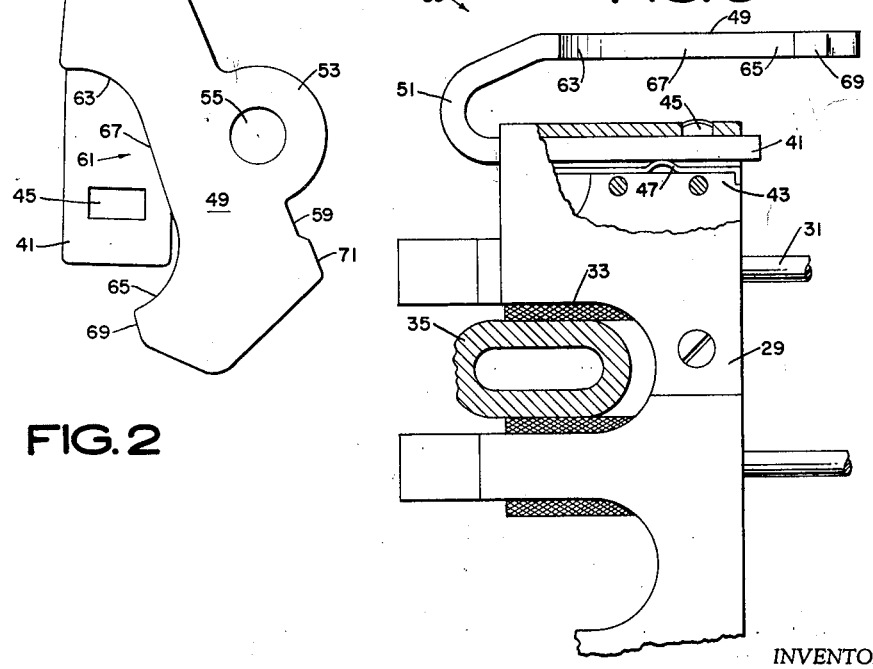
INVENTOR,
Marion R. Farmer Nov. 10, 1964 M. R. FARMER 3,156,081
COTTON PICKER SPINDLE SLAT POSITIONER HINGE MEANS
Filed Sept. 12, 1962 3 Sheets-Sheet 2

INVENTOR,
Marion R. Farmer

BY
Weatherford & Weatherford
attys

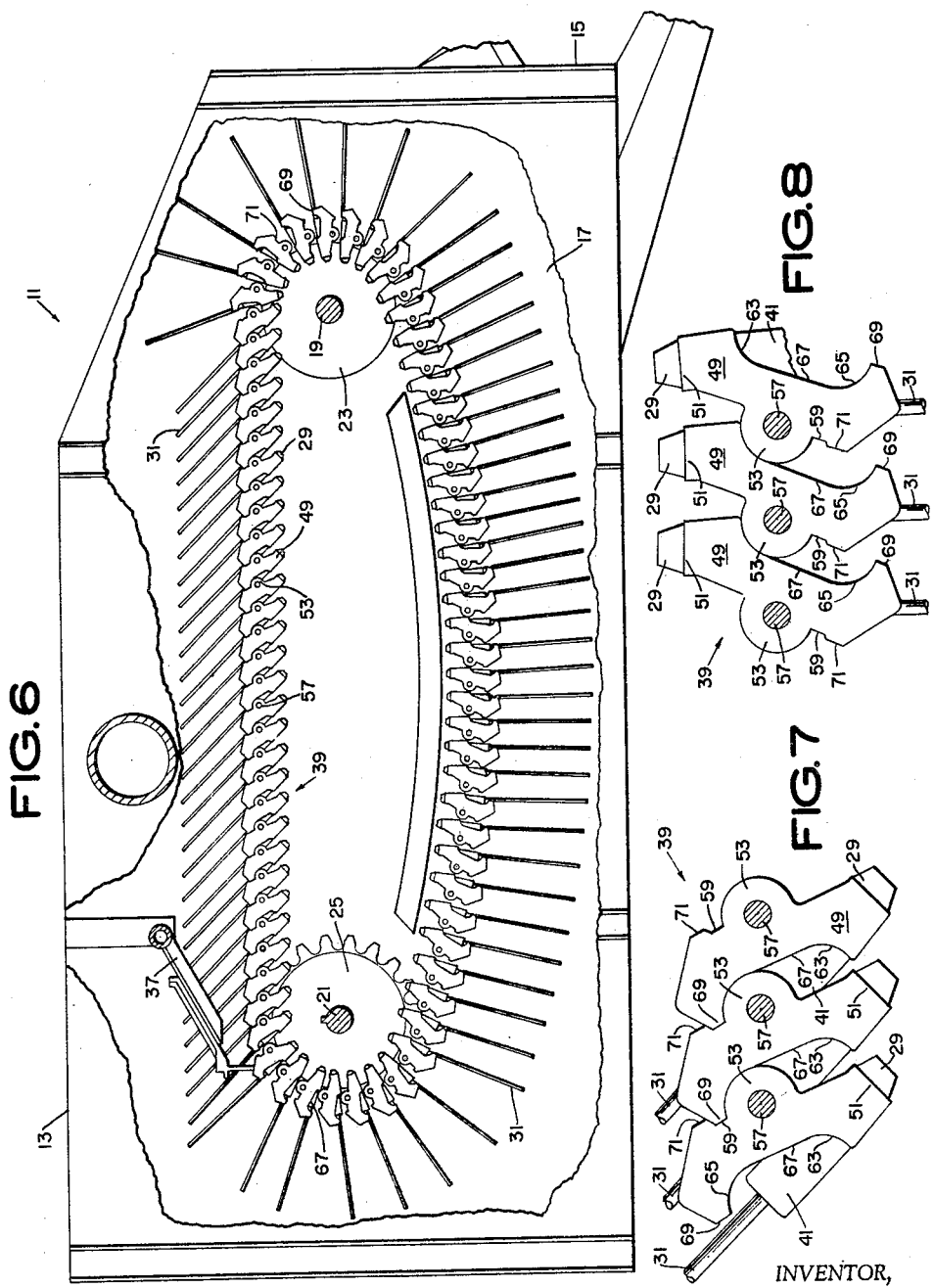

United States Patent Office 3,156,081
Patented Nov. 10, 1964

3,156,081
COTTON PICKER SPINDLE SLAT POSITIONER HINGE MEANS
Marion R. Farmer, Pine Bluff, Ark., assignor to Ben Pearson, Incorporated, Pine Bluff, Ark., a corporation of Arkansas
Filed Sept. 12, 1962, Ser. No. 223,224
9 Claims. (Cl. 56—42)

This invention relates to certain new and useful improvements in cotton picker means, and particularly relates to cotton picker means which comprise a plurality of rotating rod-like spindles driven in an elongated path and brought into relationship with the fiber on the cotton plants.

In machines for accomplishing such cotton picking a multiplicity of rotatable spindles are rotatably supported in horizontally spaced, vertically disposed banks, each vertical bank being supported by a slat or similar supporting device by which the spindles are carried and by which they are exposed to the desired means for effecting rotation thereof. The spindle supporting slats are interconnected by hinge means to upper and lower drive chains by which they are moved through an elongated path being driven into exposed relationship with the cotton fibers upon the plants in a cotton row and moved thereafter to a stripping zone in which the cotton fiber is removed from the spindles and thence to return into a picking zone.

As is apparent, the spindles as their supporting chains successively pass about the ends of the elongated somewhat oval path upon which the chains are engaged, are accelerated and driven at a greater rate as well as being separated from their normal relationship in the picking and stripping sides of the machine. In prior devices at the rear end of the chain path it has been found desirable to place a so-called positioning board against which the spindles were impinged in order to stop the whip and swing resulting from the centrifugal force of passing about the curvature of the path end to position the respective and successive spindles in a trailing position for passage through the stripper means mentioned above by which the cotton fiber is removed from the spindles.

As a result of this repeated and frequent impingement against the positioning board much danger of damage to the spindles is encountered since frequently they may be bent by the impact against the positioning board, and the frequent engagements of the respective spindles with the positioning board effects an additional wear upon the spindles accelerating the need for the replacement of the spindles. Furthermore the positioning board is an additional item of expense in the fabrication of a cotton picking machine, and in view of the frequent impingement of spindles thereagainst, the positioning boards quickly wear out and require replacement, adding to the expense imposed upon the owner and user of such a cotton picking machine.

It is desirable that the spindles be positioned in angular parallelism, which may be called a trailing position, as they are moved into and through the stripper means and along what may be termed the "stripping side" of the cotton picking machine. It is further desirable that the spindles be disposed substantially perpendicularly relative to the drive chains as they are moved through the picking zone on what may be termed the "picking side" of the cotton picking machine. Prior devices have been substantially ineffective in maintaining the picking position of spindles as they are advanced into relationship with the plants from which the fiber is to be removed, and have been more particularly inefficient in arranging the proper trailing disposition of the spindles as they approach and pass through the stripper means and along the stripping sides of the device.

The present invention is intended to cure these deficiencies and does so through the provision, preferably at the upper and lower ends of the respective spindle supporting slats and at least at one or the other end of the slats, of hinge means connected with the drive chains and rigidly connected to the respective slats, with the hinge means being specially provided with means for arranging and controlling the position of the slats in the various movements through the cotton picking machine.

The principal object of the present invention is to provide cotton picking slats for cotton picking machines with new and improved positioning hinge means.

A further object of the invention is to provide such hinge means which are interengageable to maintain the successive slats with their spindles projecting in parallel trailing position as the spindles and slats are passed along the stripping side of the cotton picking machine, and which hinge means shift under such travel into engagement to maintain the spindles in relation substantially perpendicular to the drive chains as they are moved through the picking side of the cotton picking machine.

A further object of the invention is to provide such hinge means which includes means for rigidly connecting the hinge means to the spindle supporting slats.

A further object of the invention is to provide such hinge means which include a hinge arm having a hub for the reception of a hinge pin, which hub has as its leading edge a substantially arcuate projecting portion.

A further object of the invention is to provide such a hinge means in which the trailing edge of the hinge arm includes an elongated recess having arcuate inner and outer ends respectively adapted to mate with the arcuate surface of the hub.

A further object of the invention is to provide such a hinge means in which a notch is provided in the leading edge of the hinge arm adjacent to the hub, and a nose is provided on the trailing edge of the hinge means adjacent to the outer arcuate surface of the recess, the nose being adapted to mate with the notch for firm engagement of the parts together; and A further object of the invention is generally to improve the design, construction and efficiency of hinge means adapted for use in cotton picking machines.

The means by which the foregoing and other objects of the present invention are accomplished and the manner of their accomplishment will be readily understood from the following specification upon reference to the accompanying drawings, in which:

FIG. 1 is a top plan view of the cotton picking machine with parts broken away for purposes of illustration.

FIG. 2 is a top plan view of a preferred embodiment of the hinge means of the present invention showing one form of the means for rigidly connecting the hinge means to the spindle carrying slats.

FIG. 3 is a fragmentary side elevational view of the upper end of one of the slats showing a hinge means of the type of FIG. 2 connected therewith.

FIG. 6 is a plan view of a scale somewhat enlarged from that of FIG. 1 illustrating the disposition of the parts during operation of the device.

FIG. 7 is a fragmentary partial view illustrating the interengagement of hinge means along the stripping side of the cotton picking machine.

FIG. 8 is a view similar to FIG. 7 illustrating the shifted position of the hinges during the passage of the slats along the picking side of the cotton picking machine.

Figures 4, 5:
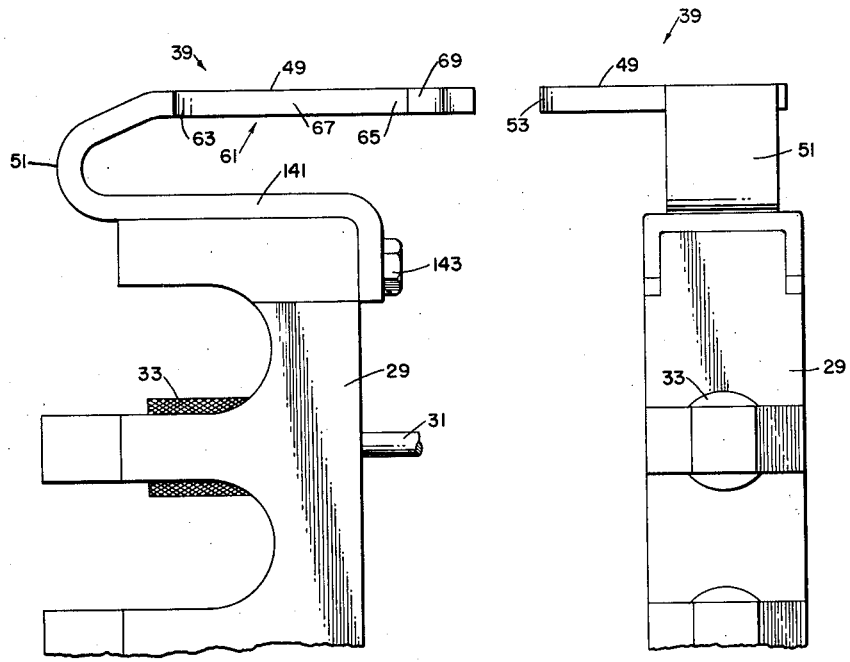
FIG. 4 is a view similar to FIG. 3 illustrating a variation in the means connecting the hinge means to the slat.
FIG. 5 is an end elevational view of the device as shown in FIG. 4.

Referring now to the drawings in which the various parts are indicated by numerals, an embodiment of a cotton picking machine 11 is shown which includes a suitable housing 13 encasing the instrumentalities thereof. At its forward end housing 13 may be provided with an entrance throat 15 of suitable conformation which defines the forward end of the picking side 17 of the cotton picking machine. Mounted in machine 11 are front and rear shafts 19, 21, for the support and drive of the picking means. On the respective shafts are mounted substantially circular members about which slat supporting chains are trained. Thus on front shaft 19 are preferably mounted upper and lower idlers 23 which are shown as discs, although idler sprockets may be used, the shaft and idlers being so supported as to provide an idler assembly; and upon rear shaft 21 are fixed sprockets 25, a suitable drive being connected to rear shaft 21 so as to effect drive of the shaft 21 and sprockets 25.

Preferably such drive as is well known may be coupled to a tractor or other vehicle upon which the cotton picking machine is mounted, and is driven by the motive power of such tractor or other similar carrier. Trained about the idlers and sprockets 23, 25 are upper and lower chains 27. The respective spindle carrying slats 29 span vertically between and are suitably attached to upper and lower chains 27 in the manner hereinafter described providing the movement of the respective slats 29 along a relatively elongated path, with the spindles 31 carried by the slats 29 projecting outwardly therefrom.

Each of slats 29 is ubstantially upright and vertical and carries a vertical bank of horizontally outwardly extending spindles 31, the spindles being equally spaced apart vertically along the carrying slats 29. Each of spindles 31 is rotatably supported by its supporting slat and the spindles of adjacent slats are arranged in substantially horizontal layers which are vertically spaced apart.

Each of spindles 31 is provided with a drive roller 33 at the inner end of the respective spindles, which is adapted to engage with a suitable form of drive rail 35 which extends along the picking side of picking machine 11 and is, as is well known, preferably disposed between vertically adjacent pairs of spindle layers so that two sets of spindles successively pass above and below the same drive rail, with the result that the spindles are rotated by such passage with the supervening layer of spindles being rotated in one direction and the subjacent layer of spindles being rotated in the opposite direction. Preferably, as is indicated in the drawings, the drive rail area of the picking side of the cotton picking machine is slightly bowed outwardly along a gently curved path in order to better project the spindles into the area of the cotton to be picked.

It will be understood that the formation of the spindle supporting slats may be of a number of configurations, although as here shown and as is preferred, the spindle supporting slats are respectively integral members in which the spindles are rotatably supported. They may be otherwise fabricated members if desired without departing from the scope of the present disclosure.

On the opposite side of picking machine 11, a vertically disposed bank of stripper bars 37 is arranged just forwardly of rear sprockets 25 and supported to angularly or diagonally intersect the path of travel of the spindles 31 as they are moved around the sprockets. These stripper bars are supported at their outer ends in usual fashion and extend into the pathway of the spindles 31 as they leave the rear sprockets 25 in such manner that the spindles are drawn through and between the stripper bars so as to cause the removal of the cotton fiber from the respective spindles to drop by gravity into a suction area from which the cotton fiber may be transported to a suitable receptacle.

As heretofore pointed out, it is desirable that as the respective slats 29 and the spindles 31 carried thereby leave the rear sprockets 25 they should be disposed at a trailing position of angularity relative to the line of movement in which the outward tip of the spindles is rearwardly disposed relative to the slats in order to properly pass through stripper bars 37, and it is further desirable that this condition be maintained in order not to interfere with the operation of the device as the spindle carrying slats are moved forwardly along the stripping side of the cotton picking machine.

It further is desirable, as has been heretofore mentioned, that after the spindle carrying slats are passed around the forward idlers 23 the spindles and the slats by which they are carried should be so disposed that the spindles extend perpendicularly away from the chains 27 as the slats are advanced along the picking side of the cotton picking machine.

In order so to connect and control the spindle carrying slats with the respective drive chains 27, the respective slats are provided preferably at their upper and lower ends with hinge members 39 which are adapted to be secured rigidly to the respective slats and which are furthermore adapted to be hingedly secured to the respective upper and lower chains 27. Hinge members 39 are symmetrical in that the upper hinge member is arranged for forward movement at the upper end of the slat in accordance with the following description and the lower hinge member is similarly and symmetrically arranged in an inverted manner for similar movement. It will be understood that the present description relates to a single cotton picking machine which, as illustrated, is a machine adapted for use at one side of a cotton picker and that in a cotton picking machine used for the opposite side of a cotton picker the parts will be similarly symmetrical but reversely arranged.

In one embodiment of the device, as shown in the drawings, hinge members 39 are provided with an attachment portion 41 which is adapted to extend into a chamber 43 which is provided with an opening for the reception of a lug 45 carried on attachment portion 41, and a key 47 may be inserted below attachment portion 41 in order to insure the engagement of lug 45 and of attachment portion 41 within chamber 43.

In another embodiment of the device the hinge member 39 may be provided with an attachment portion 141 which engages with the upper end of slat 29 in such a manner as rigidly to connect the slat to the hinge, the attachment portion 141 projecting downwardly over the surface of slat 29 and being affixed thereto as by a suitable bolt 143.

In either instance the hinge 39 is rigidly fixed to the slat 29 with which it is associated and is attached thereto in such manner as to control the positioning of the spindles extending from the slat relative to the adjustments in position of the hinge member. It will be understood that there are other means by which the hinge members may be connected rigidly to the respective slats and that the variation in such connection does not depart from the present invention. The attachment portions of the respective hinge members are interconnected with hinge arms 49 by a substantially U-bent portion at the inner ends of the hinge arms and of the attachment portions of the hinge members.

Each of the hinge arms 49 is laterally offset in the direction of drive movement away from the attachment portions mentioned above and for the purposes hereinafter mentioned. It will be understood that the attachment portions are rigidly connected to the respective slats in such manner that they are normal to the slat, and upon shift of the hinge members the slats are similarly hingedly shifted. The hinge arms 49 are connected to the attachment portion of the hinges so that the realtively longitudinal axis of each of the hinge arms is somewhat angularly offset from the axis of the attachment portion, this offsetting being in a leading direction having reference to the direction of movement of the spindle supporting slats as they are moved through the operational area of the device.

The leading edge of each of the hinge members is provided with a hub 53 which projects forwardly beyond the leading edge of the hinge arm 49 and is an externally semi-circular member. Internally hub 53 is apertured as at 55 to receive a hinge pin 57 by which the hinge is connected with the respective upper and lower chains 27.

The leading edge of hinge arm 49 adjacent hub 53 is provided with a notch 59 having a flat base, the flat base of the notch 59 being substantially in diametrical alinement with the opposite side of hub 53 in order to provide for the control of the member.

The trailing edge of hinge member 39 is provided with a recess 61 having an inward arcuate surface 63 and an outward arcuate surface 65 interconnected by a substantially flat surface 67, the substantially flat surface 67 being disposed angularly or diagonally relative to the medial center line of the attachment portion of the hinge, so that outward surface 65 is disposed somewhat forwardly of inward surface 63. The respective arcuate surfaces 63, 65 are formed to alternately embrace and fit a part of the edge of hub 53.

Adjacent the outward arcuate surface 65 of recess 61 the hinge arm is provided with a nose 69. Nose 69 is adapted to nest into the notch 59 of the next succeeding hinge member and is accordingly provided with a substantially flat face. Adjacent to notch 59 the leading edge of each of the hinge arms is provided with a projecting land 71 which is adapted to receive and engage with the face of nose 69 on the next adjacent spindle hinge arm.

In the use of the device the respective spindle supporting slats have selected hinge members rigidly connected thereto. After being so connected the device is in general condition for operation, and upon drive of the sprockets through the drive means of the carrier or other external source of power, the belt consisting of the chains and the slats is driven about the appointed path of an elongated nature.

As the respective slats are moved toward and around the area of the rear sprockets 25 the acceleration of movement of the respective slats about their hinge pins as well as the radial separation in virtue of passage around the sprocket causes the hinge members to move to a condition in which the hubs 53 successively engage against the outer arcuate surface 65 of the recess 61 of the next forward slat hinge. At the same time nose 69 of such next forward hinge is moved into solid engagement with the notch 59 adjacent to the hub of the hinge arm next following. In this manner the successive spindle slat assemblies are held in a position in which the spindles are retracted relative to the direction of movement in the cotton picking machine so as to be in a trailing position somewhat diagonal to the direction of movement, better positioning the spindles for introduction to the stripper means heretofore mentioned.

With the hinge elements thus interlocked, the hub of the hinge being interengaged with the outward arcuate part 65 of the recess of the next forward hinge element, and the nose 69 of the hinge arm being engaged with the notch 59 of the next following hinge element, the hinges are held in a positively engaged position and accordingly the spindle carrying slats as they move along the stripping side of the machine are locked so that the spindles project in a trailing position rearwardly diagonalled relative to the line of travel.

Thus positioned, the spindles are in condition to pass between the stripper bars 37, and as the positioning of the spindles is positively established by the interengagement and arrangement of the respective hinge elements, it is apparent that it is unnecessary to provide any obstruction or other device for limiting the movement of the spindles beyond the trailing position desired, and thus the possible additional wear upon the spindles that might be occasioned by contact with a positioning device is eliminated as well as eliminating the danger of bending or otherwise distorting the spindles relative to the slat by which the spindles are carried. The slats are thus moved forwardly along the stripping side of the machine in substantially undisturbed angular position relative to the machine and the line of travel of the chains.

As the slats successively reach the forward idlers 23 the chains 27 curve about the idlers causing thereby a separation of the successive slats from the successively following slats. In this movement the nose 69 moves away from notch 59 and temporarily rides along land 71 until the nose clears contact with the land. During this movement hub 53 is being moved inwardly relatively along recess 61 of the next preceding hinge element and in this movement begins to effect a camming action upon the preceding hinge so as to effect a shift of that hinge positively into position so that the slat by which it is carried is disposed substantially perpendicularly to the chains 27, with the spindles 31 projecting perpendicularly from the chains.

As the movement of the slats around the forward idler is concluded, and as the slats enter the picking zone in which the slats are being moved rearwardly by the drive of the device, the hub of each of the succeeding hinges is moved inwardly into engagement with inward arcuate surface 63 of the recess 61 of the next preceding hinge. In this manner the hinge elements are again successively interlocked in a shifted position in which the spindles project substantially perpendicularly relative to the drive chains 27 and in such position the slats and spindles carried thereby are moved rearwardly along the picking side of the picking machine.

As they are thus moved rearwardly, the drive rollers 33 of the respective spindles are brought into rotating contact with the drive rails 35 and cotton picking rotation of the spindles is thereby set up and is continued through the picking zone on the picking side of the machine. As the slats successively leave the picking zone and picking side of the machine and approach the rear sprockets 25 the chains 27 curve around the sprockets and effect a separation of the hinge elements so as to disengage the perpendicular interengaging and locking disposition of the hinge elements just described, and to provide for the movement of the hinge elements into the stripping side interengagement, above described, in which the hub of the hinge element moves outwardly relatively into engagement with the outward arcuate surface of the recess 61 of the next forward hinge element, the nose of that next forward hinge element being then engaged with the notch 59 of the next following hinge element and the process repeats itself as the device continues in operation.

It will be understood that the exact configuration of the hub, the nose, the notch, the land, and the recess of the respective hinge elements may be varied under varying circumstances and accordingly the present description is to be considered as illustrative only.

I claim:

1. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, slat positioning hinge means connected to the upper and lower ends of said slats and interconnecting said slats to said chains, substantially circular means at the front and rear ends of said machine, said substantially circular means including sprocket means at one end of said machine and idler means at the other end of said machine, said chains being trained about and engaging said substantially circular means, said positioning hinge means having hinge arms spaced from the adjacent slat ends and offset from the longitudinal axis of the slat, each said hinge arm including a hub extending from the leading edge of the hinge arm in the direction of movement of the chains, said hubs being hingedly connected with said chains, the leading part of said hubs being substantially semi-circular and centered on the respective connections with said chains, a notch formed in the leading edges of said hinge arms adjacent and outward of said hubs, a relatively elongated recess in the trailing edge of said hinge arms, said recess including arcuate inward and outward surfaces formed on radii substantially equal to the radius of said hub, for snugly alternately engaging with said hub of an adjacent following hinge arm, a nose on said trailing edge adjacent said outward surface positioned for separately fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains, passage of said slats about the forward substantially circular means relieving the holding of said slats in such diagonal spindle positioning and shifting said hubs into engagement with the inward recess surfaces holding the slats in position with said spindles projecting substantially perpendicularly relative to said chains during slat movement along the picking side of the machine.

2. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the front and rear ends of said machine, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms spaced from the adjacent slat ends and offset from the longitudinal axis of the slat, each said hinge arm including a hub extending from the leading edge of the hinge arm in the direction of movement of the chains and hingedly connected with its related said chain, the leading part of said hubs being substantially semi-circular and centered on the respective chain connections, a notch formed in the leading edges of said hinge arms adjacent and outward of said hubs, a relatively elongated recess in the trailing edge of said hinge arms, said recess including arcuate inward and outward surfaces formed on radii substantially equal to the radius of said hub, for snugly alternately engaging with said hub of an adjacent following hinge arm, a nose on said trailing edge adjacent said outward surface positioned for separately fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains, passage of said slats about the forward substantially circular means relieving the holding of said slats in such diagonal spindle positioning and shifting said hubs into engagement with the inward recess surfaces holding the slats in position with said spindles projecting substantially perpendicularly relative to said chains during slat movement along the picking side of the machine.

3. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the respective front and rear ends of said machines, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms spaced from the adjacent slat ends and offset from the longitudinal axis of the slat, each said hinge arm including a hub extending from the leading edge of the hinge arm in the direction of movement of the chains and hingedly connected with its related said chain, the leading part of said hubs being arcuate, a notch formed in the leading edges of said hinge arms adjacent and outward of said hubs, a relatively elongated recess in the trailing edge of said hinge arms, said recess including arcuate inward and outward surfaces formed on radii substantially equal to the radius of said hub, for snugly alternately engaging with said hub of an adjacent following hinge arm, a nose on said trailing edge adjacent said outward surface positioned for separatably fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains, passage of said slats about the forward substantially circular means relieving the holding of said slats in such diagonal spindle positioning and shifting said hubs into engagement with the inward recess surfaces holding the slats in position with said spindles projecting substantially perpendicularly relative to said chains during slat movement along the picking side of the machine.

4. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the respective front and rear ends of said machine, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms spaced from the adjacent slat ends and offset from the longitudinal axis of the slat, each said hinge arm including a hub extending from the leading edge of the hinge arm in the direction of movement of the chains and hingedly connected with its related said chain, a notch formed in the leading edges of said hinge arms adjacent and outward of said hubs, a relatively elongated recess in the trailing edge of said hinge arms, said recess including inward and outward surfaces, for alternately engaging with said hub of an adjacent following hinge arm, a nose on said trailing edge adjacent said outward surface positioned for separatably fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains, passage of said slats about the forward substantially circular means relieving the holding of said slats in such diagonal spindle positioning and shifting said hubs into engagement with the inward recess surfaces holding the slats in position with said spindles projecting substantially perpendicularly relative to said chains during slat movement along the picking side of the machine.

5. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge, means connected to the upper and lower ends of said slats and interconnecting said slats to said chains, substantially circular means at the respective front and rear ends of said machine, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms spaced from the adjacent slat ends and offset from the longitudinal axis of the slat, each said hinge arm including a substantially semi-circular hub extending from the leading edge of the hinge arm in the direction of movement of the chains and hingedly connected with its related said chain, a relatively elongated recess in the trailing edge of said hinge arms, said recess including inward and outward arcuate surfaces, for alternately engaging with said hub of an adjacent following hinge arm, passage of said slats about the rear substantially circular means separating said slats and said positioning hinge means preceding entry into the stripping side of said machine, said hubs engaging within the outward surface of the recess of the next preceding hinge arm when along the stripping side of said machine holding the slats in position with the spindles projecting therefrom trailingly diagonal relative to said chains, passage of said slats about the forward substantially circular means relieving the holding of said slats in such diagonal spindle positioning and shifting said hubs into engagement with the inward recess surfaces holding the slats in position with said spindles projecting substantially perpendicularly relative to said chains during slat movement along the picking side of the machine.

6. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the respective front and rear ends of said machine, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms spaced from the adjacent slat ends and offset from the longitudinal axis of the slat, each said hinge arm including a hub extending from the leading edge of the hinge arm in the direction of movement of the chains and hingedly connected with its related said chain, the leading part of said hubs being substantially semi-circular and centered on the respective chain connections, a notch formed in the leading edges of said hinge arms adjacent and outward of said hubs, a relatively elongated recess in the trailing edge of said hinge arms, said recess including an arcuate outward surface formed on a radius substantially equal to the radius of said hub, for snugly engaging with said hub of an adjacent following hinge arm, a nose on said trailing edge adjacent said outward surface positioned for separatably fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains.

7. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the respective front and rear ends of said machine, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms spaced from the adjacent slat ends and offset from the longitudinal axis of the slat, each said hinge arm including a hub extending from the leading edge of the hinge arm in the direction of movement of the chains and hingedly connected with its related said chain, the leading part of said hubs being arcuate, a notch formed in the leading edges of said hinge arms adjacent and outward of said hubs, a relatively elongated recess in the trailing edge of said hinge arms, said recess including an arcuate outward surface formed on a radius substantially equal to the radius of said hub, for snugly engaging with said hub of an adjacent following hinge arm, a nose on said trailing edge adjacent said outward surface position for separatably fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains.

8. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the respective front and rear ends of said machine, said substantially circular means including sprocket means at one end of said machine and idler means at the other end of said machine, said chains being trained about and engaging said substantially circular means, said hinge means including slat positioning hinge means connected to at least one end of each slat, said positioning hinge means having hinge arms offset from the longitudinal axis of the slat, each said hinge arm including a hub extending from the leading edge of the hinge arm in the direction of movement of the chains and hingedly connected with its related said chain, a notch formed in the leading edges of said hinge arms adjacent and outward of said hubs, a relatively elongated recess in the trailing edge of said hinge arms, said recess including an outward surface for engaging with said hub of an adjacent following hinge arm, a nose on said trailing edge adjacent said outward surface position for separatably fitting into the notch of the adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging the notches of the next following hinge arms of the slats when along the stripping side of said machine holding the slats in position with the spindles projecting therefrom trailingly diagonal relative to said chains.

9. In a cotton picking machine which comprises a plurality of slats supporting rotatable cotton picking spindles, drive means for rotating said spindles, stripper means for stripping picked cotton from said spindles, upper and lower endless chains supporting and moving said spindle supporting slats into and away from spindle driving contact with said drive means along the picking side of the machine and through said stripper means on the stripping side of the machine, hinge means connected to the upper and lower ends of said slats and interconnecting said slats to said chains, substantially circular means at the respective front and rear ends of said machine, said substantially circular means including sprocket means at one end of said machine and idler means at the other end of said machine, said chains being trained about and engaging said substantially circular means, said hinge means including slat positioning hinge means having hinge arms offset from the longitudinal axis of the slat, each said hinge arm including a hub extending from the leading edge of the hinge arm in the direction of movement of the chains and hingedly connected with its related said chain, a notch formed in said leading edge, a relatively elongated recess in the trailing edge of said hinge arms, a nose on said trailing edge, said recess including an outward surface for engaging with said hub of an adjacent following hinge arm, passage of said slats about the rear substantially circular means separating said slats and said positioning hinge means preceding entry into the stripping side of said machine, said hubs engaging the outward surface of the recess of the next preceding hinge arm and said noses engaging said notches when along the stripping side of said machine holding the slats in position with the spindles projecting therefrom trailingly diagonal relative to said chains.

References Cited in the file of this patent
UNITED STATES PATENTS 2,723,519   Fergason _____ Nov. 15, 1955
2,751,742   Keith et al. _____ June 26, 1956